United States Patent [19]

Higgins

[11] Patent Number: 4,783,789
[45] Date of Patent: Nov. 8, 1988

[54] ANNULAR LASING APPARATUS

[76] Inventor: Warren W. Higgins, 5818 Jane Way, Alexandria, Va. 22310

[21] Appl. No.: 751,503
[22] Filed: Jul. 2, 1985
[51] Int. Cl.$^4$ .................... H01S 3/082; B23K 9/00
[52] U.S. Cl. .................... 372/97; 372/94; 250/432 R; 219/121.76
[58] Field of Search ............ 372/97, 93, 94, 95; 250/432 R, 435, 492.1, 343; 356/246, 318; 376/103, 104; 219/121 LS

[56] References Cited

U.S. PATENT DOCUMENTS

| | | | |
|---|---|---|---|
| 3,808,550 | 4/1974 | Ashkin | 372/97 |
| 3,940,711 | 2/1976 | Casperson | 372/92 |
| 4,341,730 | 7/1982 | Maier | 376/103 |
| 4,434,341 | 2/1984 | Busby | 219/121 LS |

OTHER PUBLICATIONS

Hanlon et al., "Helros $CO_2$ Fusion Laser Alignment System", Conference Proceeding of the Society of Photo-Optical Instrumentation Engineers, vol. 179, Adaptive Optical Components II, 1979, pp. 61–66.
"Cylindrical Laser Resonators", J. Opt. Sco. Am. 63, 25 (1973), by L. W. Casperson.
"Properties of a Radial Mode $CO_2$ Laser", IEEE J. Quant. Electron. 9, 484 (1973), by L. W. Casperson and C. Romero.
An Introduction to Lasers and Their Applications, by W. R. Callen and W. T. Rhodes, Addison–Wesley, Reading, Mass., 1978.

Primary Examiner—James W. Davie
Assistant Examiner—Georgia Y. Epps
Attorney, Agent, or Firm—Samuel M. Freund

[57] ABSTRACT

Annular lasing apparatus. A plurality of combinations of substantially cylindrical optical components with appropriate laser gain materials are disclosed for generating approximately cylindrical substantially uniform regions of laser radiation suitable for the uniform irradiation of bulk materials for purposes of photochemical processing thereof. Superposition of contributions from the output of two or more laser oscillators having cylindrical optics were also found to provide adequate uniformity in a radiation volume of significant proportions thereby permitting the efficient utilization of laser radiation in a well-characterized irradiation region. Moreover, the use of cylindrical optics permits the radiation volume to be tailored to the particular requirements of the photochemical or photophysical material processing technology.

14 Claims, 9 Drawing Sheets

ANNULAR LASING APPARATUS

BACKGROUND OF THE INVENTION

The present invention relates generally to lasers and more particularly to an annular lasing apparatus especially well-suited for the uniform irradiation of flowing fluids.

Laser chemistry and laser processing of materials has received much attention from chemists and laser technologists for several years. Among the difficulties in performing efficient irradiations of fluids in continuous processing situations is the pencil-shaped transmission characteristics of the laser output. That is, mixtures of materials intended for laser-induced reaction are generally transported through cylindrical pipes in which irradiation is also convenient. To maximize the interaction of photons and molecules, irradiation along the direction of flow would provide the longest pathlength. However, this is unusually difficult to arrange in most situations. Irradiation normal to the flow, even with multiple reflection arrangements, cannot result in uniform irradiation of all of the material in the reaction region. Clearly, a radial irradiation geometry would be more efficient since the flowing fluid could be illuminated with substantial uniformity about its entire circumference, and processes can be envisioned where an intense, uniform irradiation region having a short length in the direction of the flow of materials would be advantageous.

Additionally, a radial irradiation geometry would be of value in ionizing streams of molecules or atoms for introduction into ion acceleration systems.

Cylindrical laser resonators have been described by L. W. Casperson in "Cylindrical Laser Resonators," J. Opt. Soc. Am. 63, 25 (1973), and by L. W. Casperson and C. Romero in "Properties of a Radial Mode $CO_2$ Laser," IEEE J. Quant. Electron. 9, 484 (1973). U.S. Pat. No. 3,940,711, "Cylindrical Laser Resonator," issued to L. W. Casperson on Feb. 24, 1976 combines the teachings of both of the above-referenced publications. The first of these references teaches a disk resonator in which the radiation propagates partially in the radial direction. The author states that the properties of such resonators include high field intensity and uniformity of illumination near the axis of the resonator, and that applications might include the excitation, vaporization, ionization, or fusion of samples. However, the analytical expressions given for the radial dependence of the laser energy demonstrate that this energy is sharply peaked at the axis. The energy is uniform about the axis though. In the second reference, the authors teach the use of a mode suppressing aperture within a disk-shaped amplifying medium to reduce the angular dependence of the mode structure, thereby increasing the number of radially propagating modes. It is stated that the resonator described therein provides an extreme focusing of the laser energy at the axis, albeit symmetrically disposed thereabout. In some processes, however, where the irradiated sample has a finite diameter (not extremely small), it would be advantageous to have an intense, substantially uniform in the radial direction, and short length in the direction of the axis heating zone which cannot be obtained from the lasers taught in the above-mentioned references.

The patent to Casperson discloses both disk and tube configuration lasers, but claims only the tube configuration. The first and third of the above-mentioned references describe the use of a fixed position, continuous, concentric inner partially reflecting mirror to extract the laser radiation in the region of the axis of the disk resonator, while the second and third references teach the use of a small mirror in the shape of a truncated cone that is located at the axis position to skim a part of the laser energy from the resonator and reflect it out through a hole at the top of thereof. There are no teachings of the use of other than a fixed position, continuous cylindrical outer mirror in cooperation with the above-described output coupling mirrors in order to achieve the disk laser properties described.

The conditions for stability for an optical resonator include the radii of curvature of the mirrors, their spacing and the indices of refraction of the laser gain medium and the materials which are to receive the laser radiation, this latter index of refraction becoming important for resonator configurations where the irradiated material is inside of the laser cavity. In *An Introduction to Lasers and Their Applications*, by D. C. O'Shea, W. R. Callen and W. T. Rhodes, Addison-Wesley Publishing Company, Reading, Mass., 1978, a simplified description of the stability criteria is given in chapter 3. In particular, FIG. 3.10 (b) shows that the confocal resonator design utilized by Casperson in the references described hereinabove is only marginally stable at best. Although such resonators are useful under certain circumstances, they can be used only with an active medium that has a high small-signal gain, for example, carbon dioxide or carbon monoxide, which places severe limits on their useful wavelength range. In order to design a resonator which satisfies the conditions of stability, it is necessary to have some adjustable parameters such as the radii of curvature of the mirrors and their relative positions, and in general, the problem of excessive diffraction losses is overcome by curving the mirrors slightly inward toward the cavity; that is, by making them concave inward. Moreover, micrometer adjustment of the relative positions of laser resonator mirrors, as is commonly practiced in the field, reduces the machining tolerances required for an operable resonator. In the Casperson resonator design, the mirror radii are fixed by the dimensions of the disk, and the inner mirror is inwardly convex. Indeed, the only disk laser described as having been constructed and tested by Casperson is the radial mode TEA laser with the on-axis output coupling mirror to couple a portion of the laser radiation out of the resonator as shown in FIG. 5 of his patent and in FIG. 3 of the second of the journal publications described hereinabove. With the obvious absence of any inner internal reflectors, this embodiment of Casperson's resonator is stable, and thus more readily made operable.

SUMMARY OF THE INVENTION

Accordingly, it is an object of the present invention to provide an apparatus for uniformly irradiating a static or flowing fluid with laser radiation at a chosen wavelength.

Another object of my invention is to provide an apparatus for uniformly irradiating a static or flowing fluid with laser radiation at more than one wavelength.

Yet another object of my invention is to provide an apparatus for uniformly ionizing gaseous media.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the apparatus hereof may include a plurality of cylindrical outer reflectors each having a reflective surface, these outer reflectors being symmetrically arranged in a plane as opposing pairs about the perimeter of an outer circle each reflector having its reflective surface directed toward the center of the circle, a plurality of cylindrical inner reflectors each having a partially reflecting principal reflecting surface and a second surface, these inner reflectors being disposed as opposing pairs substantially symmetrically about the perimeter of an inner circle in the same plane as that containing the outer reflectors and concentric therewith, there being one inner reflector pair for each of the outer reflector pairs, each of the outer reflector pairs and its corresponding inner reflector pair forming two colinear optical resonators, one resonator on each side of the center of the two concentric circles having a major diameter of the outer circle as an optical axis therefor, each of the inner reflectors having its principal reflecting surface directed away therefrom, laser gain material located in between the two circles suitable for supporting and amplifying electromagnetic oscillations generated inside of the optical resonators, which oscillations originate and travel in the general direction of the optical axis of theh particular optical resonator involved, and means for depositing energy in the laser gain material. Amplified oscillations exit the optical resonator through the inner reflector as laser radiation, the contributions from the plurality of oscillators producing approximately uniform radiation intensity over a portion of the region between the pairs of inner reflectors surrounding the center. It is preferred that a baffle originating away from the center and directed substantially radially away therefrom is employed to substantially eliminate circulating or whisper modes propagating in the gain medium. Such modes are modes of oscillation which propagate in a non-radial direction, making glancing or grazing incidence reflections off of the outer laser structures, and are undesirable since they "steal" laser energy from other, more desirable modes. Moreover, certain applications of my invention may require that each optical resonator pair has its own gain material and excitation source so that more that one wavelength of laser radiation can be generated by the apparatus thereof. It is also anticipated that for some applications of the present invention, the second surface of the cylindrical inner reflectors of certain of the optical resonator pairs would be partially anti-reflection coated so that the two optical resonators in a chosen pair thereof can interact thereby producing increased laser radiation in the region between the cylindrical inner reflectors.

In a further aspect of the present invention, in accordance with its objects and purposes, the apparatus hereof may also include a plurality of cylindrical reflectors each having a reflective surface and being arranged in a plane around the perimeter of an outer circle in opposing pairs, each reflector having its reflective surface directed toward the center of the outer circle, each of the opposing pairs of reflectors forming an optical resonator having its optical axis along a diameter of the outer circle, laser gain material located inside of the outer circle and outside of a concentric inner circle suitable for supporting and amplifying electromagnetic oscillations therein which oscillations originate and travel in the general direction of the optical axis of the particular optical resonator involved, the amplified electromagnetic oscillations emerging from the laser gain material in the region inside of the inner circle as laser radiation, and means for depositing energy into the laser gain medium in order to provide the energy required for the laser oscillation. The laser intensity inside of the inner circle represents a superposition of contributions from all of the resonators and has an approximately uniform intensity in the region surrounding the center of the concentric circles. It is preferred that a baffle originating away from the center of the outer circle and directed substantially radially away therefrom by employed to substantially prevent whisper modes from propagating in the gain medium. Moreover, certain applications of my invention may require that each optical resonator pair has its own gain material and excitation source so that more that one wavelength of laser radiation can be generated by the apparatus thereof.

In still another aspect of the present invention, in accordance with its objects and purposes, the apparatus hereof may also include a plurality of opposing pairs of concave cylindrical outer reflectors each having a reflective surface and a first height, disposed substantially symmetrically and in a substantially planar manner along the perimeter of an outer circle having a center and extending approximately an equal distance on either side of this plane, all of the reflective surfaces facing toward the center; a plurality of convex cylindrical inner reflectors each having a reflecting surface and a second height chosen to be smaller than the first height, disposed as opposing pairs substantially symmetrically and in a substantially planar manner along the perimeter of an inner circle substantially concentric with the outer circle substantially symmetrically on each side of the plane of the inner circle, there being one pair of inner convex cylindrical reflectors for each outer reflector pair, each of the convex cylindrical inner reflectors having its reflective surface facing away from said center whereby each of the outer reflector pairs and its corresponding inner reflector pair forms a single stable optical resonator having its optical axis along a diameter of the outer circle; laser gain material located inside the outer circle and outside of the inner circle suitable for supporting laser oscillation therein, whereby an electromagnetic oscillation originating substantially along the optical axis of any of the optical resonators and inside of the laser gain material experiences amplification as it travels between the inner and outer reflectors substantially along the optical axis associated with the optical resonator therefor, and the amplified oscillation exits the region substantially between the inner and outer reflectors within the region on either side of the plane of the outer circle outside of the height dimension of the inner reflectors but within the height of the outer reflectors as laser radiation, forming thereby substantially two spaced-apart regions of radiation, and whereby the laser intensity in two spaced-apart substantial portions of this region surrounding an axis perpendicular to the outer circle and passing through the center represents a substantially uniform superposition of contributions from all of the stable resonators; and means for depositing energy into the gain medium in order to provide the energy required for the laser oscillation and amplification. Preferably, the inner reflectors have totally reflective surfaces in order to prevent substantial focused laser radiation from entering the region in between these reflectors in the plane of the outer circle according to the overall gain of each of the stable resonators, although some applications are envisioned where such a third region of laser radiation would be of value.

In yet another aspect of the present invention, in accordance with its objects and purposes, the apparatus hereof may include a plurality of first laser oscillators having cylindrical optics and disposed substantially symmetrically in a first conical circle with the output thereof being directed to an irradiation region outside of the first circle and having an axis passing therethrough which also passes through the center of the first circle in a perpendicular manner to the plane thereof, and a plurality of second laser oscillators having cylindrical optics and disposed substantially symmetrically in a second conical circle located on the axis on the side of the region of confluence of the laser outputs from the first laser oscillators away from the first circle, the laser outputs from the second laser oscillators also being directed through the region, whereby an approximately cylindrical region of substantially uniform laser radiation is produced in the region. Preferably, each of the second laser oscillators is arranged such that it is located opposite to one of the first laser oscillators forming thereby a plurality of oscillator pairs. Applications of the present invention may be anticipated where the output couplers of the laser oscillators are anti-reflection coated in order that they may cooperate in opposing pairs to increase the laser radiation in the region of irradiation.

In another aspect of my invention, in accordance with its objects and purposes, the apparatus hereof may also include a plurality of laser oscillators having cylindrical optics disposed in opposing pairs substantially symmetrically in a first circle having a first center in a plane determined by the centers of the output couplers thereof and an axis perpendicular thereto, the output from each laser oscillator being directed to a first region along the axis outside of the first circle forming thereby a first approximately cylindrical region of substantially uniform laser radiation, and a plurality of substantially symmetrically disposed opposing pairs of cylindrical mirrors for receiving the laser radiation exiting the first region and reflecting this radiation, there being one opposing pair of mirrors cooperating with each pair of opposing laser oscillators, each of the mirrors having its reflective surface substantially facing the reflective surface of the outer mirror in the pair thereof, the lines between the centers of the mirrors in each pair of mirrors crossing the axis at a second center located away from the first center, whereby the radiation received by the plurality of opposing mirrors is reflected by at least one of the mirrors into the region of the second center forming thereby a second approximately cylindrical region of substantially uniform laser radiation along the axis.

In still another aspect of my invention, in accordance with its objects and purposes, the apparatus hereof may include a plurality of first concave cylindrical reflectors each having a reflective surface and disposed substantially symmetrically as opposing pairs in a substantially planar manner along the perimeter of an outer circle, the outer circle having a first center and a first axis, each reflector having the reflective surface thereof substantially facing the first center, each of the opposing pairs of first reflectors having an axis passing substantially through the center of the reflective surface of both reflectors which is also a major diameter of the outer circle; a plurality of second cylindrical reflectors each having a reflective surface disposed as substantially symmetrically as opposing pairs in a substantially planar manner along the perimeter of a second circle having a second center located on the first axis and spaced-apart from the first center, each having the reflective surface thereof substantially facing the second center, each of the opposing pairs of second cylindrical reflectors having an axis passing substantially through the center of the reflective surface of both reflectors which is also a major diameter of the second circle, there being a corresponding opposing pair of second cylindrical reflectors for each opposing pairs of first cylindrical reflectors, the axis of each corresponding opposing pair of second cylindrical reflectors being substantially parallel to the axis of the opposing pair of first cylindrical reflectors; a laser gain medium located inside said outer circle and outside of a concentric inner circle suitable for supporting laser oscillation and amplification therein, whereby an electromagnetic oscillation originating substantially along the axis of any one of the opposing pairs of first cylindrical reflectors and inside of the laser gain medium experiences amplification as it travels substantially along the axis, a complete laser oscillator being formed by an opposing pair of first cylindrical reflectors within which the laser oscillation began and the corresponding opposing pair of second cylindrical reflectors, whereby a first approximately cylindrical region of substantially uniform laser radiation is formed surrounding the first axis in the vicinity of the first center representing a substantially uniform superposition of contributions from all of the opposing pairs of first cylindrical reflectors, a second approximately cylindrical region of substantially uniform laser radiation is formed in the vicinity of the first axis in between the first center and the second center, and a third approximately cylindrical region of substantially uniform laser radiation is formed in the vicinity of the second center; and means for depositing energy into the gain medium in order to provide the energy required for the laser oscillation and amplification.

In yet another aspect of my invention, in accordance with its objects and purposes, the apparatus hereof may also include a plurality of laser half-oscillators, each having cylindrical optics and disposed substantially symmetrically in opposing pairs about the axis of the desired approximately cylindrical region of substantially uniform laser radiation, the optical axes thereof being substantially parallel thereto, and a plurality of pairs of opposing cylindrical mirrors, one cylindrical mirror on each side of the axis of the desired approximately cylindrical region of substantially uniform laser radiation and substantially equally distant therefrom, each pair thereof disposed substantially in the plane of the desired approximately cylindrical region of substantially uniform radiation and inside the cavity of a complete laser oscillator formed by two opposing half-oscillators and a pair of cylindrical mirrors, thereby completing the optical path therebetween.

Benefits and advantages of the present invention include the ability to irradiate a static or flowing gas or a mixture of gases uniformly over a volume for producing atomic or molecular excitation, vaporization or ionization for a plurality of purposes. The irradiation region can be arranged to be in the form of an intense region of laser radiation uniformly distributed about and extending away for a substantial distance from an axis, which is preferably the axis of flow of the materials undergoing some photochemical process, and having a relatively short dimension along the direction of flow. In many instances, such an irradiation geometry has advantages over the cusp-shaped laser energy distribution described by Casperson et al. hereinabove and that produced by a laser source having a conventional pencil-shaped output.

BRIEF DESCRIPTION OF THE DRAWINGS

The accompanying drawings, which are incorporated in and form a part of the specification, illustrate three embodiments of the present invention and, together with the description, serve to explain the principles of the invention. In the drawings.

DETAILED DESCRIPTION OF THE PREFERRED EMBODIMENTS

Briefly, the present invention includes apparatus for providing uniform irradiation to a material either flowing or static and in any phase. The invention derives from the realization that the use of two or more lasers operating in their 00 mode radially disposed about the region of radiation vastly improves the uniformity thereof in two dimensions. Increasing the number of lasers further improves the uniformity, but the improvement rapidly becomes very small with additional lasers. The use of cylindrical optics permits the irradiation region to be made into a disk-shaped region which is a most convenient irradiation geometry. Clearly, planar optics are a special case of curved optics and are included in the teachings of the present invention. It should also be mentioned that stability of the optical resonators of my invention must be achieved independently both in the plane of the optical resonator and perpendicular thereto by an appropriate combination of radii of curvature of the optical elements and their relative locations. Moreover, by selecting the modes of the participating lasers, it is anticipated that the uniformity and shape of the irradiation region can be further tailored to fit the requirements of the process of interest.

Figure 1:
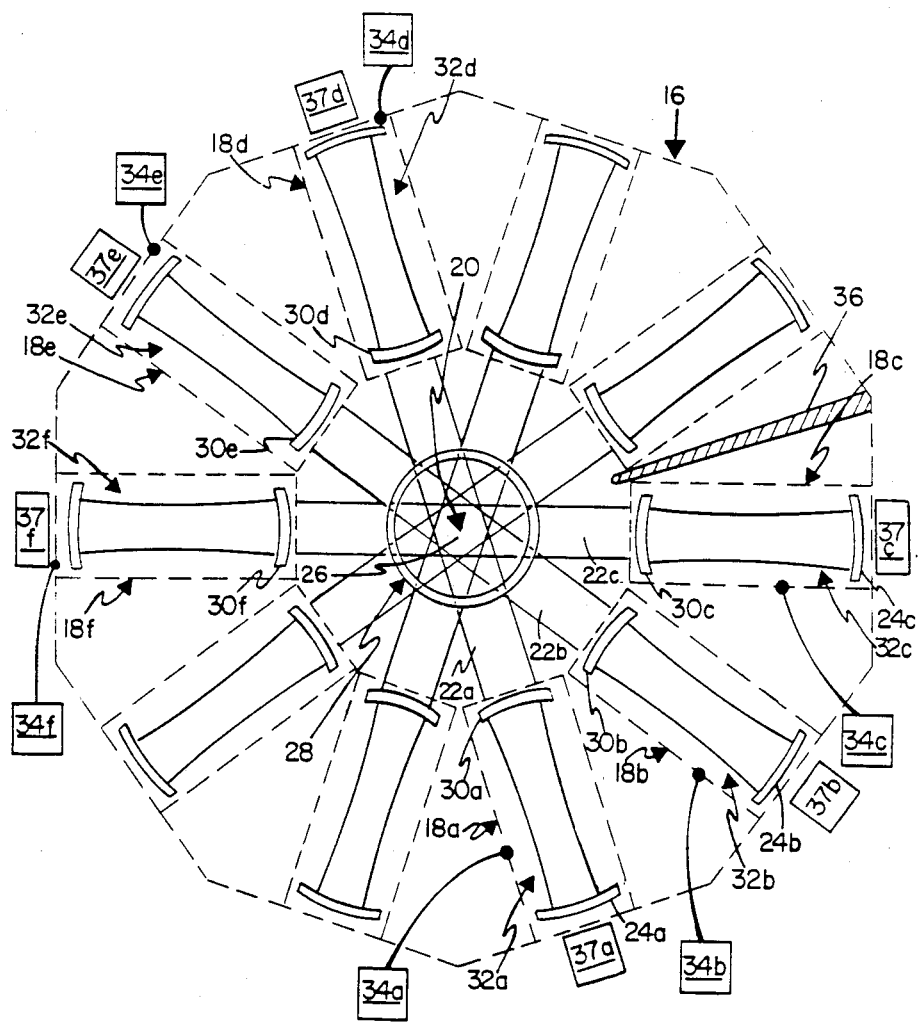
FIG. 1 is a schematic representation of the top view of an illustrative embodiment of the apparatus of the present invention for the purpose of illustrating the operation thereof wherein a plurality of lasers are disposed around an irradiation region in such a manner that the effect of their concerted outputs directed therein produces a substantially uniform irradiation of the material contained therein.

Reference will now be made in detail to the present preferred embodiments of the invention, examples of which are illustrated in the accompanying drawings. Similar or identical structure therein is denoted by identical numbers throughout. Turning now to the drawings, FIG. 1 is a schematic representation of the top view of an illustrative embodiment 16 of the apparatus of the present invention shown for the purpose of illustrating the operation thereof, wherein a plurality of laser resonators 18a–c are disposed around an irradiation region 20 in such a manner that the effect of their concerted outputs 22a-c directed therein produces a substantially uniform irradiation of the material contained therein. A plurality of reflectors 24a-c are arranged about the perimeter of an outer circle which has its center 26 in the irradiation region 20 which contains flowing or static material to be irradiated perhaps surrounded by an enclosure 28 which permits the laser radiation to pass therethrough. The enclosure might be multifaceted with faces substantially perpendicular to each component of the laser radiation and anti-reflection coated to improve the coupling of the radiation into the material to be irradiated, or might be a simple cylindrical tube as shown which allows the radiation to pass and is a part of a processing system. The simple cylinder might be anti-reflection coated according to the desired result to be achieved by the present apparatus. Partially reflecting, partially transmitting inner reflectors 30a-c and, if needed, appropriate stops, not shown, complete the optical resonators associated with each laser. Laser gain material 32a-c suitable for supporting laser oscillation and amplification surrounds the inner and outer reflectors, and with an appropriate pumping sources 34a-c permits laser action to occur in the laser resonators 18a-c which results in outputs 22a-c, respectively. Situations can be envisioned where it would be desirable to have all of the laser oscillators share a common source of gain material; for example, if a series of identical gas lasers were desired for the irradiation. Baffle 36 prevents non-radial oscillations from propagating among the laser oscillators especially for the case where the laser gain media are not separated by physical barriers. To permit the sample to be uniformly irradiated from all directions in the plane of the lasers, it is preferred that each of the laser resonators 18a-c have a corresponding laser resonator 18d-f on the opposite side of the center of irradiation 26 therefrom, respectively. Moreover, in the event that the irradiated sample is relatively transparent, it may be desirable to anti-reflection coat the inner reflectors 30a-c and 30d-f in order to permit the cooperation among pairs of laser oscillators; for example, lasers 18a and 18d, which can significantly increase the irradiation intensity at the location of the region of irradiation. It is also envisioned that some or all of the outer reflectors 24a-c might be partially reflecting so that power measurements could easily be made on some or all of the lasers external to the irradiation region using conventional light intensity measurement means 37a-f for the purpose of optimizing the laser operating conditions thereof and in order to approximate the laser intensity in the irradiation region when the material containing apparatus 28 is in place. Other methods for determining the light intensity in the irradiation region and for optimizing the performance of the lasers are also possible.

Figure 2:
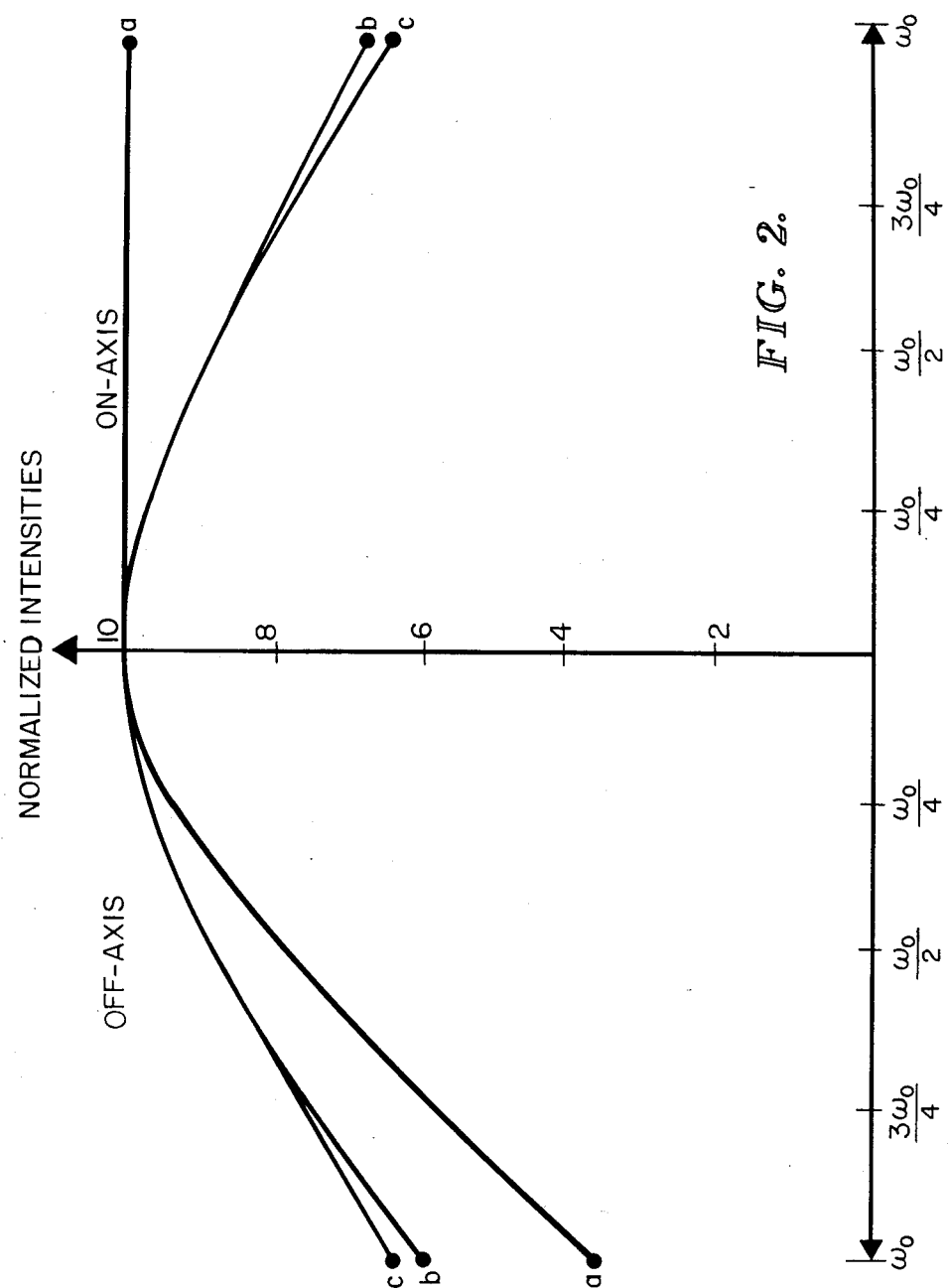
FIG. 2 is a graphic representation of the effect on the calculated on-axis normalized intensity distribution as a function of the distance away from the center of the irradiation region and that for the off-axis normalized intensity distribution of superimposing the radiation from two and three lasers each operating in its 00 mode. Shown also is the intensity distribution for a single laser.

FIG. 2 is a graphic representation of the effect on the calculated on-axis intensity distribution as a function of the distance away from the center of the irradiated region and that for the off-axis normalized intensity distribution of superimposing the radiation from two and three lasers each operating in its 00 mode. Shown also is the normalized intensity distribution for a single laser. To the left of the ordinate, which represents the normalized intensities thereof in order to facilitate the incorporation of data from more than one laser onto a single graph, curves b and c represent the superposition of two and three lasers off-axis to any one of the laser outputs, respectively. Simply stated, off-axis for the two laser case means measuring the intensity distribution of the laser radiation as a function of the distance from the center of irradiation at a 45° angle from the axis of either laser output, while for three lasers, the angle would be 30°; that is, the intensity measurements would be made in between the lasers themselves. On-axis, on the other hand, means along the axis of any of the laser outputs. To be observed is that although for one laser, the on-axis and off-axis intensity distributions are quite asymmetrical, the difference between these intensity distributions for two or more lasers rapidly decreases (curves b anc c) quickly producing a region of very uniform irradiation in a circle having a radius of about $w_0$.

Figure 3:
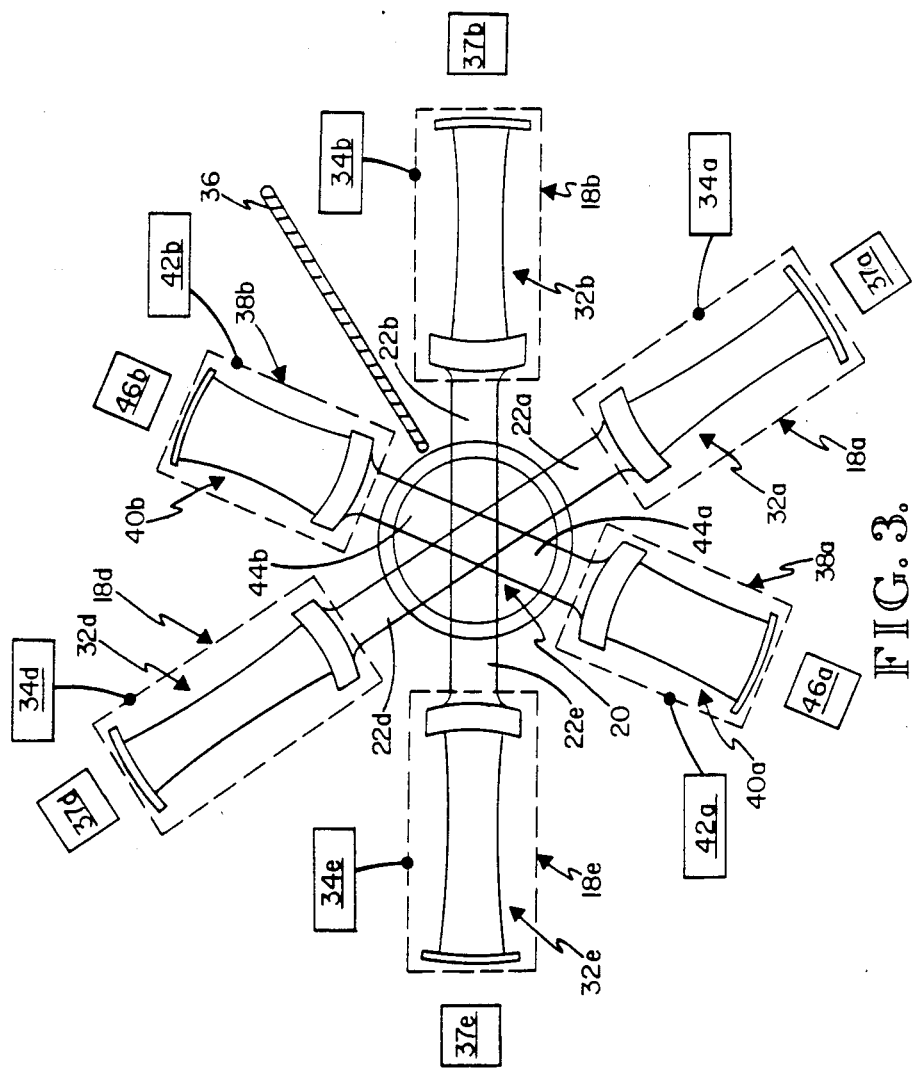
FIG. 3 is a schematic representation of the top view of another illustrative embodiment of the apparatus of my invention illustrating the operation thereof when different types of lasers are used to irradiate the region of interest.

FIG. 3 is a schematic representation of the top view of another illustrative embodiment of the apparatus of my invention illustrating the operation thereof when more than one type of laser oscillator is be used to provide different wavelengths of radiation to the irradiation region. Laser resonators 18a,b,d,e having a first wavelength are arranged with laser resonators 38a,b having a second wavelength in a configuration similar to that shown in FIG. 1 with opposing pairs of laser resonators providing uniform irradiation to region 20. Laser gain media 32a,b,d,e and 40a,b, and excitation sources 34a,b,d,e and 42a,b, respectively, permit the laser resonators 18a,b,d,e and 38a,b, respectively, to generate laser radiation 22a,b,d,e and 44a,b, respectively. Laser radiation intensity measuring means 46a,b enable the characteristics of the laser resonators 38a,b having a second wavelength to be determined.

Figure 4:
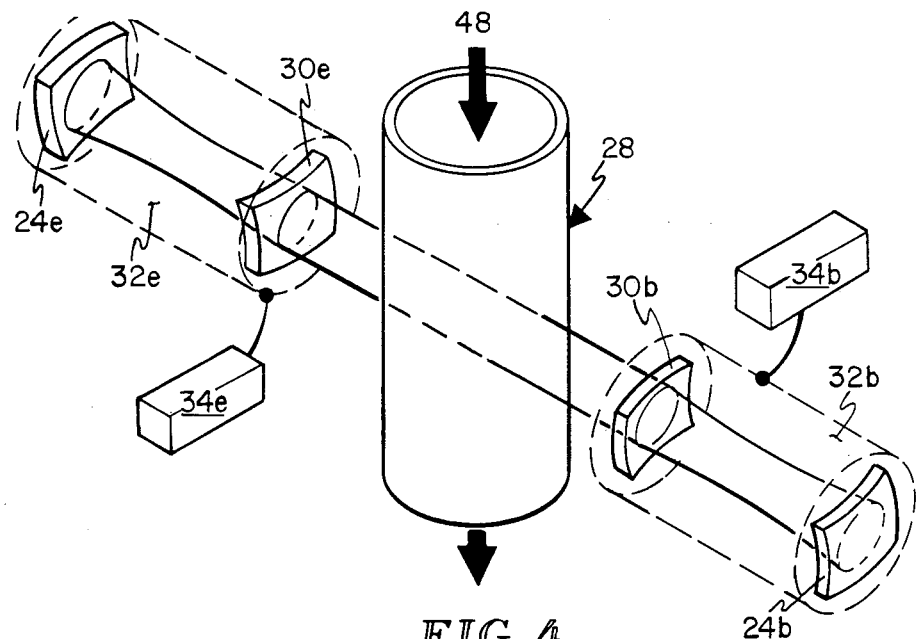
FIG. 4 shows an orthographic view of the illustrative embodiment of the apparatus of my invention shown in FIG. 1 hereof. Shown in particular is the use of cylindrical reflectors.

FIG. 4 shows an orthographic view of the illustrative embodiment of my invention as depicted in FIG. 1 hereof. Shown in particular is the use of cylindrical reflectors 24b,e and 30b,e. Shown also is the situation where gas 48 is flowing inside of a laser radiation transmitting cylindrical tube 28.

Figure 5:
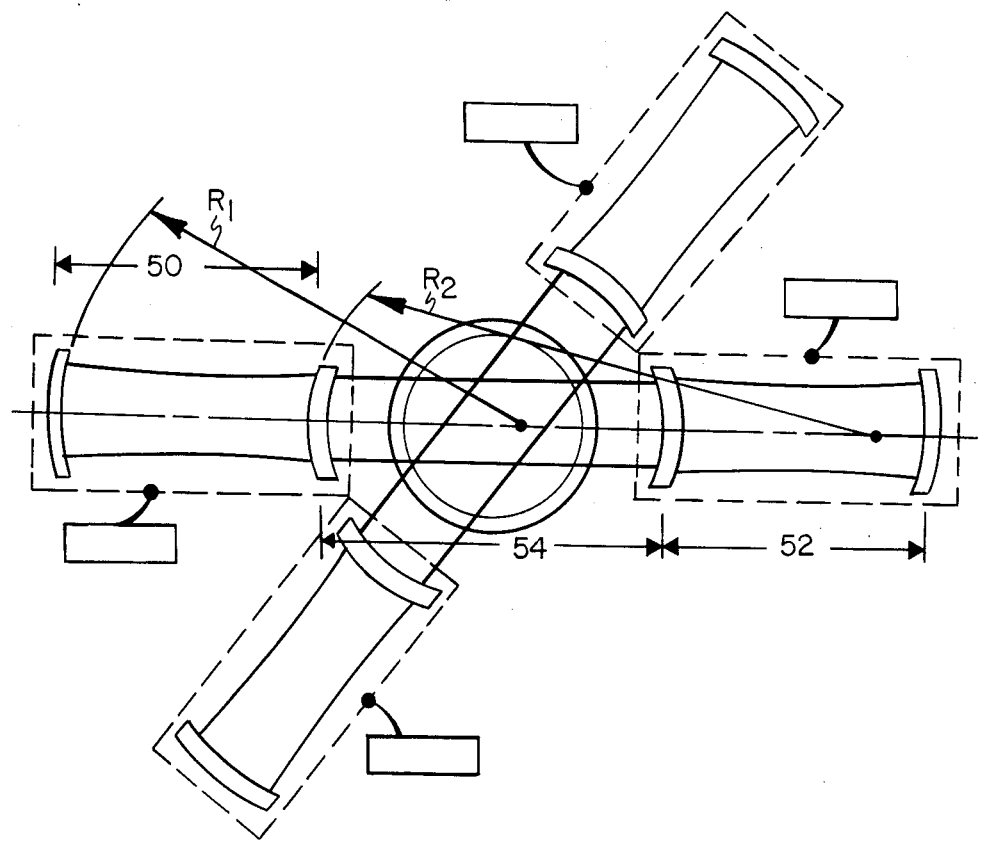
FIG. 5 is a schematic representation of the top view of the illustrative embodiment of the apparatus of the present invention depicted in FIG. 1 hereof showing the reflector surface radii which determine the stability of the optical resonator sections. If $R_1 \leq R_2$, all of the cavities are stable, for example.

FIG. 5 is a schematic representation of the top view of the generalized embodiment of the apparatus of the present invention showing the important reflector surface radii which determine the stability of the resonator sections. If $R_1 \leq R_2$, for example, resonator cavities 50,52, and 54 are all stable. Clearly, many combinations are possible and the stability criteria for particular choices of reflector configurations are well-known in the laser art.

Figure 6:
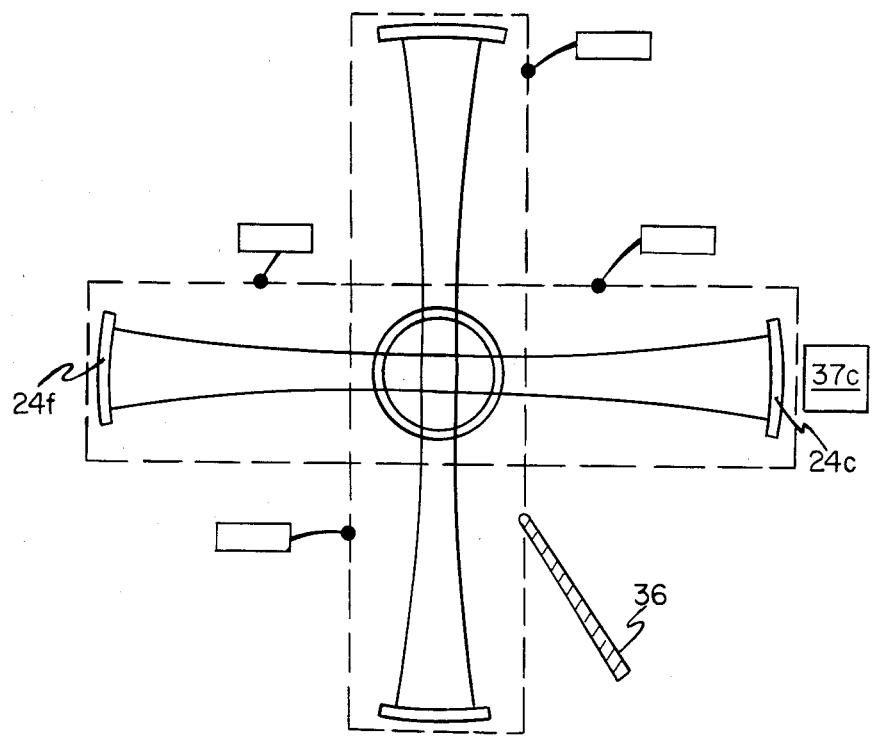
FIG. 6 is a schematic representation of the top view of yet another illustrative embodiment of the apparatus of the present invention showing the intracavity resonator configuration which would likely be employed in the situation where the material to be irradiated has low absorptivity.

FIG. 6 is a schematic representation of the top view of yet another illustrative embodiment of the apparatus of the present invention showing a intracavity resonator configuration which would likely be employed in the situation where the material to be irradiated has low absorptivity. That is, only outer reflectors, say 24c and 24f would be used. It would then be necessary to measure the laser radiation intensity emerging from one outer reflector from each opposing outer reflector pair using laser radiation intensity measuring means 37c. Baffle 36 would be much more important to prevent the propagation of whisper modes in this configuration than one in which the inner reflectors are used, especially in the situation where the laser resonators shared the same laser gain medium in an open structured container therefor. The baffle would be situated so as not to substantially interfere with the normal operation of the laser resonators.

Figure 7:
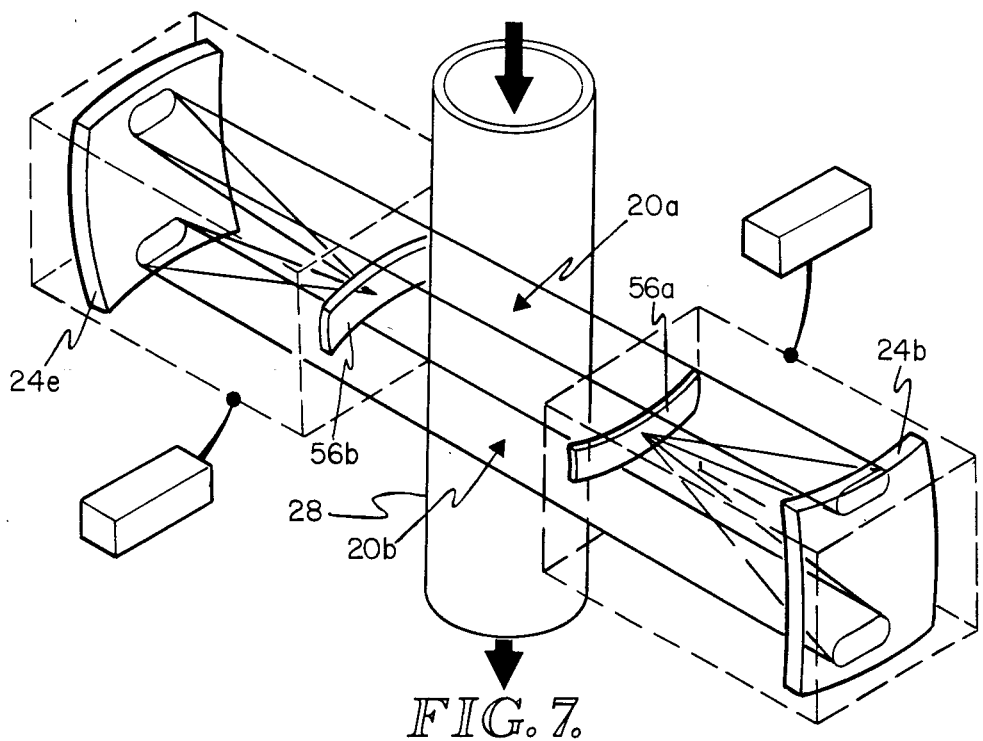
FIG. 7 shows an orthographic view of an unstable resonator embodiment of the apparatus of the present invention. Shown in the use of cylindrical mirrors selected such that the individual laser cavities are unstable, but the entire resonator is stable.
Figure 8:
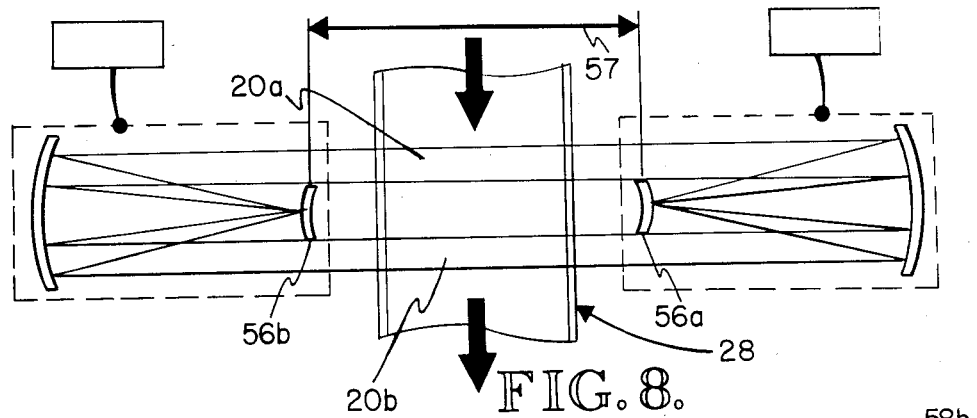
FIG. 8 is a schematic representation of the side view of the unstable cavity embodiment shown in FIG. 7 hereof showing, in particular, that there are two uniform irradiation regions spaced apart from one another.

FIGS. 7 and 8 show an orthographic and side view, respectively, of an unstable resonator embodiment of the apparatus of the present invention. Opposing inner reflectors 56a,b are selected such that the individual laser cavities are unstable, but that the entire laser resonator is stable. That is, the resonator which includes reflectors 24b,e and 56a,b is a stable resonator. To be noted is that laser radiation lost by diffraction from the cavities bounded by reflectors 56a and 24b and 56b and 24e can be recaptured by properly selecting the sizes and radii of curvature of the reflectors. The choice of inner reflectors with smaller heights than their corresponding outer reflectors provides two regions 20a,b of laser radiation intersecting the sample tube 28. It is clear that additional laser resonators disposed about sample tube 28 would be provided as required to improve the uniformity of the irradiation regions. It should also be mentioned that if reflectors 56a,b are partial reflectors, laser radiation may enter the region 57 between these inner reflectors providing thereby a third region of irradiation intersecting the irradiation region. This radiation would be focused radiation if the reflector geometry shown were employed, but other optics might be included to provide unfocused laser radiation thereto. Of course, the ultimate photochemical or photophysical processing to be enabled by the apparatus of my invention would determine the final configuration thereof.

Figure 10:
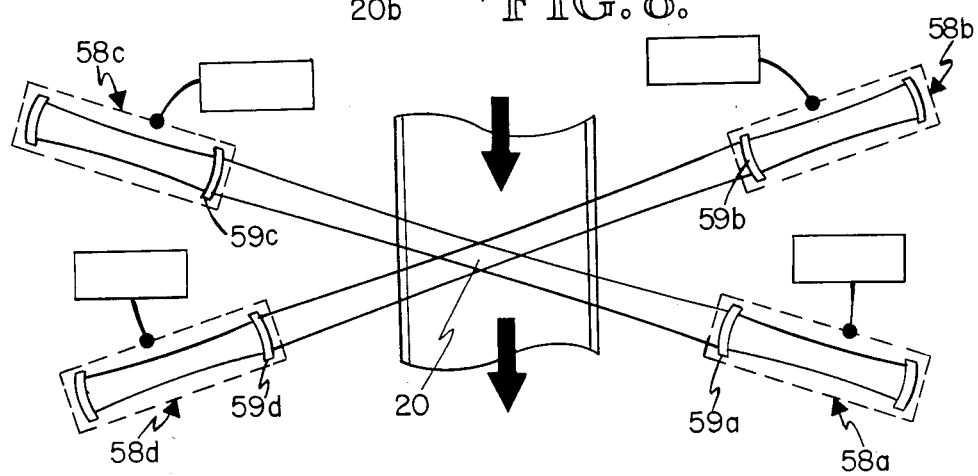
FIG. 10 is a schematic representation of a side view of the multiple plane embodiment of the apparatus of my invention shown in FIG. 9 hereof.
Figure 9:
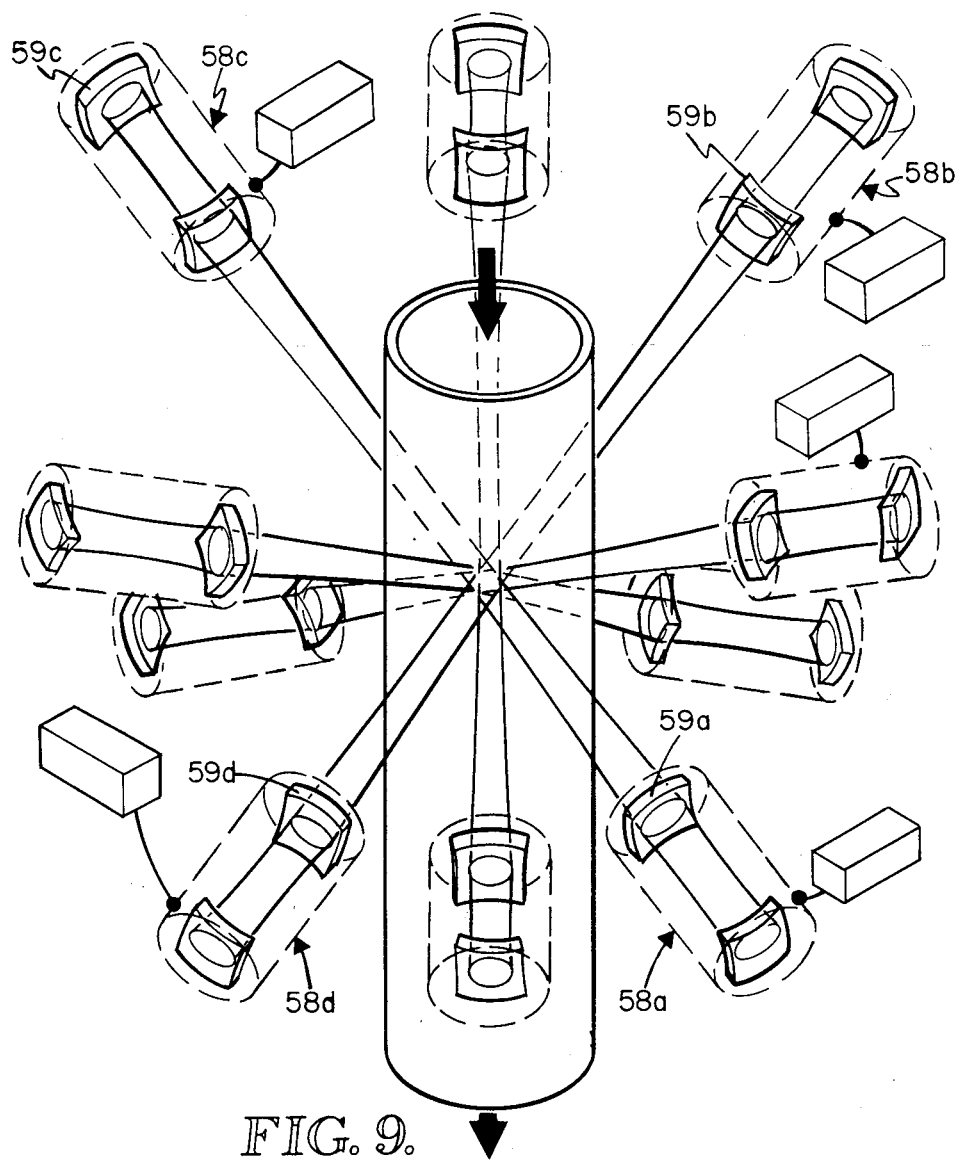
FIG. 9 is an orthographic view of a multiplanar embodiment of the apparatus of the present invention showing an irradiation geometry having laser pairs in different planes from the location of the irradiation zone.

FIGS. 9 and 10 show an orthographic view and a side view, respectively, of a multiplanar embodiment of the apparatus of the present invention. Shown therein are laser oscillators 58a–d arranged in opposing pairs 58a,c and 58b,d in order that cooperation between oscillators in a pair thereof is possible in order to increase the intensity of the radiation in the irradiation region 20 in the event that the absorption by the sample undergoing irradiation is small. The inner reflectors 59a–d might be removed in some applications to provide an apparatus which functions in a similar manner to that shown in FIG. 6 described hereinabove.

Figure 12:
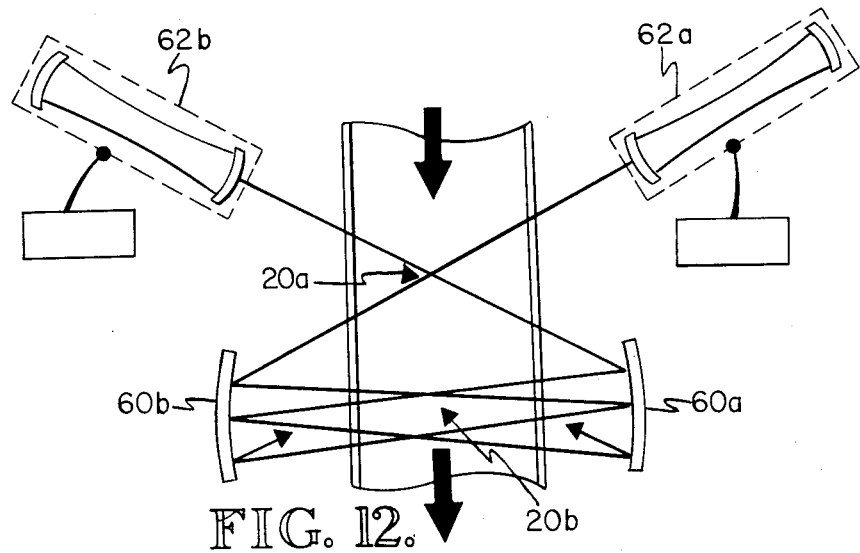
FIG. 12 shows a schematic representation of the side view of the embodiment shown in FIG. 11 hereof. To be observed is that there are two irradiation regions formed in a similar manner to FIG. 8 hereof.
Figure 11:
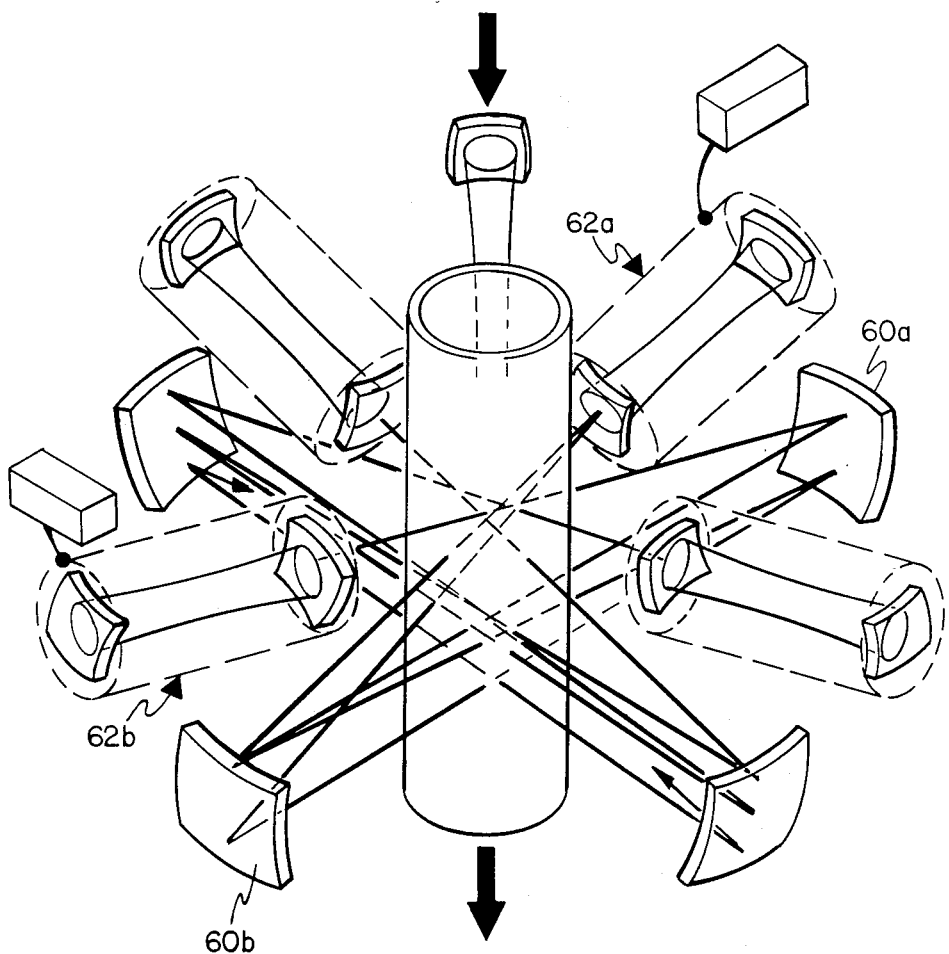
FIG. 11 shows an orthographic view of a multiplanar embodiment of the apparatus of the present invention which combines lasers and mirrors in different planes and is useful where the laser gain medium is saturated and the absorption of the radiation by the irradiated material is incomplete. Multiple passes of the laser radiation through the absorbing medium are caused to occur through the use of the external mirrors.

FIGS. 11 and 12 show an orthographic view and a side view, respectively, of a multiplanar combination of lasers and reflectors which provides two regions of uniform irradiation which intersect the processing region. Reflectors 60a,b receive the laser output from laser oscillators 62a,b after this output crosses the sample undergoing irradiation a first time forming radiation region 20a and multiply reflect it across the irradiation region 20b forming thereby the above-mentioned regions of laser radiation. The plurality of laser oscillator/reflector pairs illustrated in the Figures would produce great uniformity in these regions. This configuration would be useful in the situation where the laser gain medium is saturated and the absorption by the irradiated material is incomplete.

Figure 13:
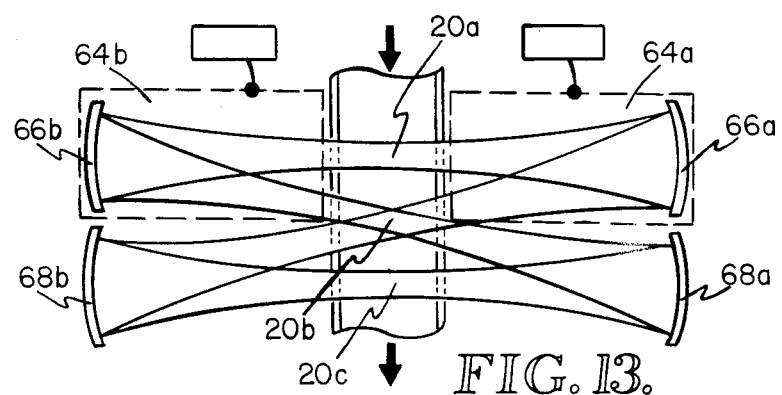
FIG. 13 shows a schematic representation of the side view of a similar embodiment to that shown in FIG. 11 hereof which would be more effective in the situation where the gain of the lasing medium is sufficiently low that multiple paths therethrough are beneficial. Three regions of sample irradiation are formed by the multiple traversal of the sample to be irradiated by the laser light, and it is the cavity formed by all four of the reflectors shown which is a stable resonator.

FIG. 13 shows a schematic representation of the side view of a similar embodiment of the apparatus of my invention to that shown in FIG. 11 hereof which would be more effective in the situation where the gain of the lasing medium 64a,b is sufficiently low that multiple paths therethrough are beneficial and the absorption by the material undergoing irradiation at the laser wavelengths employed is low. Three regions of sample irradiation 20a–c are formed by multiple traversal of the sample to be irradiated by the laser radiation, and it is the cavity formed by reflectors 66a,b and 68a,b which is a stable laser resonator. Again, a plurality of such laser resonators would be disposed about the sample for greater irradiation uniformity.

Figure 14:
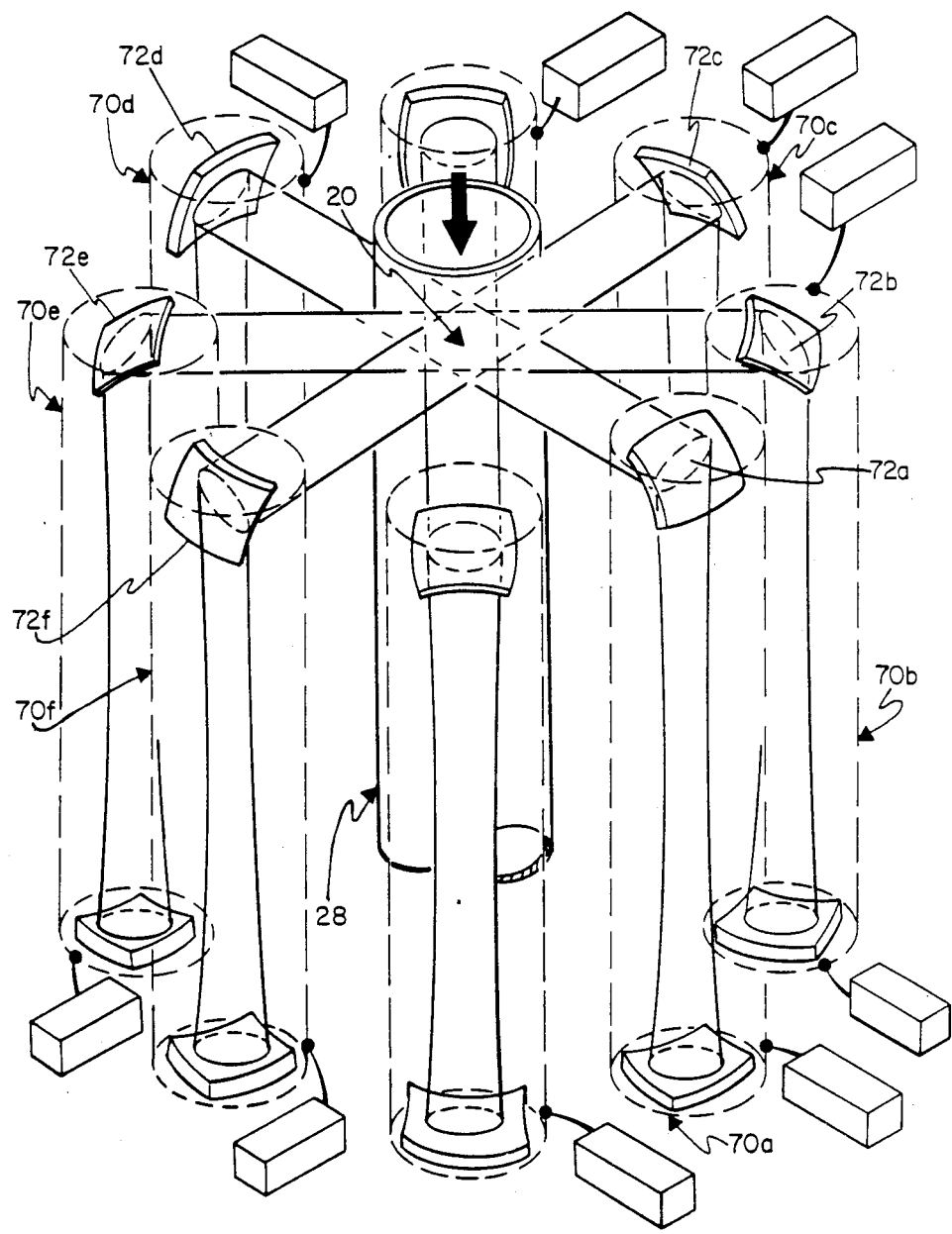
FIG. 14 is an orthographic representation of a folded laser embodiment of the apparatus of the present invention showing a more compact packing geometry for the laser half-oscillators the outputs of which are superimposed to provide the substantially uniform irradiation region.

FIG. 14 shows an orthographic representation of a folded laser embodiment of the apparatus of the present invention. Shown is a more compact packing geometry for the lasers employed. A plurality of half-laser oscillators 70a–f arranged in opposing pairs 70a,d, 70b,e and 70c,f are optically connected by reflector pairs 72a,d, 72b,e and 72c,f, respectively, to form laser oscillators having the irradiation tube 28 located intracavity thereto, the outputs therefrom forming a single region of irradiation 20.

The foregoing description of several preferred embodiments of the invention has been presented for purposes of illustration and description. It is not intended to be exhaustive or to limit the invention to the precise form disclosed, and obviously many modifications and variations are possible in the light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. An annular lasing apparatus which comprises in combination:

a. a plurality of concave cylindrical outer reflectors each having a reflective surface and being disposed as opposing pairs substantially symmetrically and in a substantially planar manner along the perimeter of an outer circle, said outer circle having a center, each of said outer reflectors having said reflective surface thereof facing toward said center;

b. a plurality of cylindrical inner reflectors each having a partially reflective principal reflecting surface and a second surface and being disposed as opposing pairs substantially symmetrically and in a substantially planar manner along the perimeter of an inner circle substantially concentric with said outer circle, there being one of said inner reflector pairs for each of said outer reflector pairs, each of said outer reflector pairs and said corresponding inner reflector pairs forming two collinear optical resonators each of said collinear optical resonators having its optical axis along a diameter of said outer circle, one of said optical resonators located on each side of said center, each of said inner reflectors having said partially reflective principal reflective surface thereof facing away from said center, the second surface of each of said cylindrical inner reflectors being partially anti-reflection coated, thereby permitting each of said optical resonators in each of said collinear optical resonator pairs to interact with the other of said optical resonators in that pair of said collinear optical resonator pairs;

c. laser gain material located inside said outer circle and outside of said concentric inner circle suitable for supporting laser oscillation therein, whereby an electromagnetic oscillation originating substantially along one of said optical axes of any of said optical resonators and inside of said laser gain material experiences amplification as it travels between said inner reflector and said outer reflector substantially along said optical axis associated with said optical resonator therefor, said amplified oscillation exiting the region between said inner reflector and said outer reflector through said inner reflector as laser radiation, and whereby the laser intensity in a substantial portion of the region between said pairs of inner reflectors and surrounding said center represents a substantially uniform superposition of contributions from all of said resonators; and d. means for depositing energy into said gain medium in order to provide the energy required for the laser oscillation and amplification.

2. The apparatus as described in claim 1, wherein said laser gain material is partitioned in a manner such that each of said colinear optical resonator pairs has associated with it laser gain material which is separate from said gain material associated with others of said colinear optical resonator pairs, whereby laser radiation of more than one wavelength can be generated in said region between said pairs of cylindrical inner reflectors.

3. The apparatus as described in claim 2 further comprising at least one baffle originating away from said center of said outer circle and directed substantially radially away therefrom for substantially eliminating whisper modes propagating through said laser gain medium, said baffle further being located a distance sufficiently away from each of said collinear opitcal resonator pairs so as not to interfere with said lasing action therein.

4. The apparatus as described in claim 3, wherein said concave cylindrical outer reflectors and said cylindrical inner reflectors have radii of curvature which satisfy the stability requirements for each of said optical resonators individually in said plurality of colinear optical resonator pairs both in the plane of the outer circle and perpendicular thereto.

5. The apparatus as described in claim 1, wherein at least one of said concave cylindrical outer reflectors can pass laser radiation generated within said laser gain material associated with said optical resonator including said cylindrical outer reflector, said apparatus further comprising laser radiation intensity measuring means for receiving and interacting with the laser radiation emerging through said cylindrical outer reflector.

6. An annular lasing apparatus which comprises in combination:
a. a plurality of concave cylindrical reflectors each having a reflective surface, said reflectors being disposed as opposing pairs substantially symmetrically and in a substantially planar manner along the perimeter of an outer circle, said outer circle having a center, each of said cylindrical reflectors having the reflective surface thereof facing the center, each of said opposing pairs of reflectors forming an optical resonator having the optical axis thereof located substantially along a major diameter of the outer circle;
b. laser gain material located inside the outer circle and outside of a concentric inner circle suitable for supporting laser oscillation and amplification therein, whereby an electromagnetic oscillation originating substantially along said optical axis of any one of said optical resonators and inside of said laser gain material experiences amplification as it travels substantially along the opitcal axis thereof between said outer reflector pair forming said optical resonator therefor, said amplified oscillation exiting said gain material into the region inside the inner circle as laser radiation, and whereby the laser intensity in a substantial portion of said region inside of the inner circle and surrounding the center represents a substantially uniform superposition of contributions from all of said resonators in the region of the center; and
c. means for depositing energy into said gain medium in order to provide the energy required for the laser oscillation and amplification.

7. The apparatus as described in claim 6, wherein said laser gain material is partitioned in a manner such that each of said plurality of optical resonators has associated with it laser gain material which is separate from said gain material associated with others of said plurality of optical resonators, whereby laser radiation of more than one wavelength can be generated thereby.

8. The apparatus as described in claims 6 or 7 wherein at least one baffle originating away from said center of said outer circle and directed substantially radially away therefrom is provided to substantially eliminate whisper modes propogating through said laser gain medium, said baffle further being located a distance sufficiently away from each of said optical resonators so as not to interfere with said lasing action therein.

9. The apparatus as described in claim 7, wherein at least one of said concave cylindrical outer reflectors can pass laser radiation generated within said laser gain material associated with said optical resonator including said cylindrical outer reflector, said apparatus further comprising laser radiation intensity measuring means for receiving and interacting with the laser radiation emerging through said cylindrical outer reflector.

10. An annular lasing apparatus which comprises in combination:
a. a plurality of concave cylindrical outer reflectors each having a reflective surface having a first height and being disposed as opposing pairs substantially symmetrically and in a substantially planar manner along the perimeter of an outer circle, the outer circle having a center, each of said concave outer reflectors being disposed symmetrically on both sides of the plane of the outer circle, said reflective surface thereof facing toward the center;
b. a plurality of convex cylindrical inner reflectors each having a reflecting surface and a second height chosen to be smaller than said first height, said convex cylindrical inner reflectors being disposed as opposing pairs substantially symmetrically and in a substantially planar manner along the perimeter of an inner circle substantially concentric with the outer circle, said convex cylindrical inner reflectors being disposed substantially symmetrically on both sides of the plane of the inner circle, there being one of said inner convex cylindrical reflector pairs for each of said outer reflector pairs, each of said convex cylindrical inner reflectors having the reflective surface thereof facing away from the center, and each of said outer reflector pairs and said corresponding inner reflector pairs forming a single stable optical resonator having its optical axis along a diameter of the outer circle;
c. laser gain material located inside said outer circle and outside of the concentric inner circle suitable for supporting laser oscillation therein, whereby an electromagnetic oscillation originating substantially along one of the optical axes of any of said optical resonators and inside of said laser gain material experiences amplification as it travels between said inner reflector and said outer reflector substantially along the optical axis associated with said optical resonator therefor, the amplified oscillation exiting the region between said inner reflector and said outer reflector within the region bounded by the difference in the first height dimension and the second height dimension on both sides of the plane of the outer circle and in between said opposing pairs of inner reflectors along the optical axis associated with each of said stable resonators as laser radiation, forming thereby two spaced-apart regions of laser radiation and one focused region laser of radiation therebetween, and whereby the laser intensity in two substantial portions of the region between said pairs of convex inner reflectors and surrounding an axis perpendicular to the plane of the outer circle and passing through the center represents a substantially uniform superposition of contributions from all of said stable resonators; and d. means for depositing energy into said gain medium in order to provide the energy required for the laser oscillation and amplification.

11. The annular lasing apparatus described in claim 10, wherein the reflective surface of each of said plurality of convex cylindrical inner reflectors is totally reflecting, thereby preventing the laser radiation from exiting each of said stable optical resonators along the optical axis associated therewith in between said opposing pairs of convex cylindrical inner reflectors.

12. The apparatus as described in claim 11, wherein at least one of said concave cylindrical outer reflectors can pass laser radiation generated within said laser gain material associated with said optical resonator including said cylindrical outer reflector, said apparatus further comprising laser radiation intensity measuring means for receiving and interacting with the laser radiation emerging through said cylindrical outer reflector.

13. An apparatus for generating an approximately cylindrical region of substantially uniform laser radiation comprising in combination:

a plurality of first laser oscillators having cylindrical optics disposed substantially symmetrically in a first circle having a first center located in a first plane determined by the centers of the output couplers thereof and a first axis perpendicular to the first plane, the output from each of said first laser oscillators being directed to a region long the first axis outside of the first circle, and a plurality of second laser oscillators having cylindrical optics disposed substantially symmetrically in a second circle having a second center located in a second plane determined by the centers of the output couplers thereof and a second axis perpendicular to said second plane, the second axis being collinear with the first axis and the second center being located on the side of the region away from the first center, the output from each of said second laser oscillators likewise being directed to the region, each of said second laser oscillators being arranged on the opposite side of the region from one of said first laser oscillators forming thereby a plurality of oscillator pairs, the output couplers of said plurality of first laser oscillators and the output couplers of said plurality of second laser oscillators being anti-reflection coated on the side thereof facing out of the oscillator cavities of said plurality of first laser oscillators and said plurality of second laser oscillators, whereby said first laser oscillators and said second laser oscillators cooperate in pairs thereof, whereby an approximately cylindrical region of substantially uniform laser radiation is produced in the region.

14. An apparatus for generating three approximately cylindrical regions of substantially uniform laser radiation sharing a common axis which comprises in combination:

a plurality of first concave cylindrical reflectors each having a reflective surface, said first reflectors being disposed as opposing pairs substantially symmetrically and in a substantially planar manner along the perimeter of an outer circle, the outer circle having a first center and a first axis, each of said first cylindrical reflectors having the reflective surface thereof substantially facing the first center, each of said opposing pairs of first reflectors having an axis passing substantially through the center of the reflective surface of both of said cylindrical reflectors in said plurality of pairs thereof and located substantially along a major diameter of the outer circle; a plurality of second cylindrical reflectors each having a reflective surface, said second reflectors being disposed as opposing pairs substantially symmetrically and in a substantially planar manner along the perimeter of a second circle having a second center located on the first axis and spaced apart from the first center, each of said second cylindrical reflectors having the reflective surface thereof substantially facing the second center, each of said opposing pairs of second cylindrical reflectors having an axis passing substantially through the center of the reflective surface of both of said second cylindrical reflectors in said plurality of pairs thereof and located substantially along a major diameter of the second circle, there being a corresponding opposing pair of said second cylindrical reflectors for each of said opposing pairs of said first cylindrical reflectors, the axis of said corresponding opposing pair of second cylindrical reflectors being substantially parallel to the axis of said opposing pair of first cylindrical reflectors; a laser gain medium located inside said outer circle and outside of a concentric inner circle suitable for supporting laser oscillation and amplification therein; and means for depositing energy into said gain medium in order to provide the energy required for the laser oscillation and amplification, whereby an electromagnetic oscillation originating substantially along the axis of any one of said opposing pairs of first cylindrical reflectors and inside of said laser gain medium experiences amplification as it travels substantially along the axis, a complete laser oscillator being formed by said opposing pair of said first cylindrical reflectors within which the laser oscillation began and the corresponding opposing pair of said second cylindrical reflectors, whereby a first approximately cylindrical region of substantially uniform laser radiation is formed in the vicinity of the first center representing a substantially uniform superposition of contributions from all of said opposing pairs of first cylindrical reflectors, a second approximately cylindrical region of substantially uniform laser radiation is formed in the vicinity of the first axis in between the first center and the second center, and whereby a third approximately cylindrical region of substantially uniform laser radiation is formed in the vicinity of the second center.

* * * * *